(12) United States Patent
Carsten et al.

(10) Patent No.: US 7,318,862 B2
(45) Date of Patent: Jan. 15, 2008

(54) STABILIZED BIOCL PIGMENTS

(75) Inventors: Griessmann Carsten, Gross-Zimmern (DE); Rathschlag Thomas, Grossostheim (DE)

(73) Assignee: Merck Patent GmbH, Darmstadt (DE)

( * ) Notice: Subject to any disclaimer, the term of this patent is extended or adjusted under 35 U.S.C. 154(b) by 157 days.

(21) Appl. No.: 11/125,170

(22) Filed: May 10, 2005

(65) Prior Publication Data
US 2005/0252417 A1   Nov. 17, 2005

(30) Foreign Application Priority Data
May 11, 2004   (DE) .................. 10 2004 023 075

(51) Int. Cl.
*C04B 14/00*   (2006.01)
(52) U.S. Cl. ............ 106/479; 106/31.6; 106/403; 106/499; 428/404; 523/205
(58) Field of Classification Search ............ 106/403, 106/446, 447, 454, 465, 479, 481, 482, 499, 106/31.6; 428/404; 523/205
See application file for complete search history.

(56) References Cited

U.S. PATENT DOCUMENTS

| | | | |
|---|---|---|---|
| 5,149,369 A * | 9/1992 | Eberts et al. ............... | 106/479 |
| 6,686,046 B2 * | 2/2004 | Schauer et al. ............. | 428/403 |
| 7,026,051 B2 * | 4/2006 | Schauer et al. ............. | 428/403 |
| 2003/0008120 A1 * | 1/2003 | Andes et al. ............... | 428/212 |
| 2003/0039930 A1 * | 2/2003 | Aylward et al. ............ | 430/496 |
| 2003/0091813 A1 * | 5/2003 | Fuller et al. ................ | 428/323 |
| 2004/0139889 A1 * | 7/2004 | Zimmermann et al. ..... | 106/415 |
| 2006/0046057 A1 * | 3/2006 | Huber et al. ................ | 428/404 |
| 2006/0155007 A1 * | 7/2006 | Huber ........................ | 523/205 |

FOREIGN PATENT DOCUMENTS

| WO | WO 2004029144 A2 * | 4/2004 |
|---|---|---|
| WO | WO 2004029160 A1 * | 4/2004 |

* cited by examiner

*Primary Examiner*—J. A. Lorengo
*Assistant Examiner*—Pegah Parvini
(74) *Attorney, Agent, or Firm*—Millen White Zelano & Branigan, P.C.

(57) ABSTRACT

The present invention relates to stabilized BiOCl pigments in which BiOCl is coated with one or more polymers and oxides, oxide hydrates or hydroxides of silicon, to a process for the production of the stabilized BiOCl pigments, and to the use thereof.

14 Claims, No Drawings

STABILIZED BIOCL PIGMENTS

The present invention relates to stabilized BiOCl pigments in which BiOCl is coated with one or more polymers and one or more oxides, oxide hydrates or hydroxides of silicon, to a process for the production of the stabilized BiOCl pigments, and to the use thereof.

Bismuth oxychloride (BiOCl) was the first synthetic, non-toxic pearlescent pigment of all and has in the meantime become one of the most important representatives from the group of pearlescent pigments. It is prepared by hydrolysis of acidic bismuth salt solutions in the presence of chloride ions. The soft sheen and the physiological acceptability have also made BiOCl-indispensable for decorative cosmetics. The low light stability (greying), the rapid settling behavior and the low mechanical resistance are the main disadvantages of BiOCl which limit or completely rule out use of these pearlescent pigments in a number of applications.

There has been a number of attempts to increase the stability of BiOCl. Thus, EP 0 498 686 describes the coating of BiOCl with cerium compounds in order to increase the light stability. However, coating with cerium compounds does not improve the mechanical stability, and the relatively high price of BiOCl is increased further through the addition of expensive cerium compounds, which makes the use of these pigments increasingly unattractive.

DE 26 03 211 discloses pulverulent pearlescent pigment compositions in which pearlescent pigments, for example BiOCl, are sheathed with polymers. The pigments described are less sensitive to mechanical stressing and can be transported inexpensively without dispersion media otherwise required.

However, the BiOCl pigments known from the prior art prove to be insufficiently stable to the action of light or to mechanical stress, which is why there continues to be a great demand for correspondingly stabilized BiOCl pigments which do not have the above-mentioned disadvantages.

An object of the invention-was therefore to provide BiOCl pigments which are light-stable, mechanically stable and only exhibit a low tendency towards agglomeration. In addition, the BiOCl pigments should have the gloss characteristic of BiOCl and should be universally usable for enabling extension of the range of applications of BiOCl to other areas, such as, for example, industrial applications. Upon further study of the specification and appended claims, further objects and advantages of this invention will become apparent to those skilled in the art.

Surprisingly, the above-mentioned requirements are satisfied by BiOCl pigments in accordance with the present invention. The present invention accordingly includes providing stabilized BiOCl pigments in which BiOCl is coated with one or more polymers and with one or more oxides, oxide hydrates or hydroxides of silicon. The present invention furthermore relates to a process for the production of stabilized BiOCl pigments in which BiOCl is coated with one or more polymers and with one or more oxides, oxide hydrates or hydroxides of silicon. The present invention likewise relates to the use of the pigments according to the invention in, for example, surface coatings, water-borne coatings, powder coatings, paints, printing inks, security printing inks, plastics, concrete, in cosmetic formulations, in agricultural sheeting and tarpaulins, for the laser marking of papers and plastics, as light protection, and for the preparation of pigment compositions and dry preparations.

BiOCl pigments in accordance with the present invention have an advantage in that they are more stable than those from the prior art. The BiOCl pigments are more stable to light and mechanical stresses and can be employed in a versatile manner in a whole series of applications. The polymers prevent the agglomeration of BiOCl crystals and thus allow the production of solid and flowable BiOCl compositions. The BiOCl pigments according to the invention exhibit no loss in luster and produce the desired pearlescent effect in the applications. The oxides, oxide hydrates or hydroxides of silicon further stabilise the BiOCl pigments mechanically. In addition, the BiOCl pigments are also chemically stabilized by these materials, i.e. the pigments behave principally in a chemically inert manner and can thus also be employed, for example, in acidic and basic application media. A further advantage arises for the application since the pigments according to the invention can be made available in a flowable presentation form.

The base BiOCl material of the BiOCl pigments according to the invention is preferably precipitated BiOCl, more preferably in the form of flakes or needle-shaped crystals; the BiOCl employed is most preferably in the form of flakes. The size of the crystal particles is not crucial per se and can be matched to the particular application. The needle-shaped particles preferably have a length of 0.05-10 μm, more preferably 0.05-5 μm, in particular 0.05-1 μm. Suitable flakes have a thickness of preferably between 0.02 and 5 μm, in particular between 0.1 and 4.5 μm. The dimension in the other two spatial directions is preferably between 1 and 500 μm, more preferably between 2 and 200 μm and in more particular between 5 and 60 μm.

One or more polymers and one or more oxides, oxide hydrates or hydroxides of silicon are applied to the BiOCl. In a preferred embodiment, separate layers of one or more polymers and of one or more oxides, oxide hydrates or hydroxides of silicon are present, but they may be provided together in the same layer. Particular preference is given to a structure in which a layer of one or more polymers and, on top of the latter, a layer of one or more oxides, oxide hydrates or hydroxides of silicon is applied to the BiOCl. BiOCl pigments of this structure prove to be particularly stable and highly suitable for use in demanding applications. In addition, the application of the one or more polymers carried out first simplifies the subsequent coating with oxides, oxide hydrates or hydroxides of silicon since the polymer layer prevents agglomeration of the BiOCl particles, and agglomeration during the subsequent coating is likewise suppressed. The optical properties of the BiOCl pigments, such as, for example, the luster, are also retained extremely well on selection of this structure. The proportion of the one or more polymers in the BiOCl pigments according to the invention is preferably 5 to 30% by weight, more preferably 5 to 20% by weight and particularly preferably 10 to 15% by weight, based on the total weight of the BiOCl pigment according to the invention. The proportion of the oxides, oxide hydrates or hydroxides of silicon is preferably 5 to 30% by weight, more preferably 5 to 25% by weight and particularly preferably 10 to 20% by weight, based on the total weight of the BiOCl pigment according to the invention.

Suitable as one or more polymers are in principle all polymers which can be applied as layers to BiOCl, in particular those which are insoluble. For the purposes of the present invention, insoluble polymers means polymers which are insoluble, after application as a layer, under the conditions necessary, for example, for application of the oxides, oxide hydrates or hydroxides of silicon, or of further additional layers, i.e. re-dissolution of the polymer layer should be substantially excluded in the production and further processing of the BiOCl pigments according to the invention. This guarantees the stability of the pigments according to the invention. For example, the one or more polymers can be selected from polyethers, polyacrylates, polyvinylcaprolactams, cellulose, polystyrenes, polyvinyl alcohols, polyvinylpyrrolidones, polyvinyl acetates, polysiloxanes, LCST or UCST polymers, polymers containing solvolyzable groups, derivatives of the said polymers or mixtures thereof. Examples of these polymers are generally known to the person skilled in the art and can be taken from the common literature for this purpose. A review of LCST or UCST polymers is given, for example, in "Polymere" [Polymers], H. G. Elias, Hüthig und Wepf-Verlag, Zug, 1996 on pages 183 ff., or in WO 01/60926 and WO 03/014229, the disclosure content of which is hereby incorporated by way of reference.

The polymers are preferably polyacrylates preferably having acid numbers (NV) of 40-300 mg of KOH, glass transition temperatures (TG/° C.) of 40-200° C. and molecular weights (Mw) of 500-20,000 daltons.

Suitable oxides, oxide hydrates or hydroxides of silicon are all representatives of this class, such as, for example, silicon oxides or silicon oxide hydrate, preferably silicon dioxide.

In a further embodiment, one or more layers may additionally be applied to the BiOCl pigments. The one or more additional layers may comprise metal oxides, metal oxide hydrates, metal suboxides, metals, metal fluorides, metal nitrides, metal oxynitrides or mixtures of these materials. The metal oxide, metal oxide hydrate, metal suboxide, metal, metal fluoride, metal nitride, metal oxynitride layers or the mixtures thereof may have a low refractive index (refractive index <1.8) or a high refractive index (refractive index $\geq 1.8$). Suitable metal oxides and metal oxide hydrates are all metal oxides or metal oxide hydrates to be applied as layers, such as, for example, aluminum oxide, aluminum oxide hydrate, iron oxide, tin oxide, cerium oxide, zinc oxide, zirconium oxide, chromium oxide, titanium oxide, in particular titanium dioxide, titanium oxide hydrate and mixtures thereof, such as, for example, ilmenite or pseudobrookite. Metal suboxides which can be employed are, for example, the titanium suboxides. Suitable metals are, for example, chromium, aluminum, nickel, silver, gold, titanium, copper or alloys, and a suitable metal fluoride is, for example, magnesium fluoride. Metal nitrides or metal oxynitrides which can be employed are, for example, the nitrides or oxynitrides of the metals titanium, zirconium and/or tantalum. Metal oxide, metal, metal fluoride and/or metal oxide hydrate layers and very particularly metal oxide and/or metal oxide hydrate layers are preferably applied to the BiOCl pigments according to the invention. Furthermore, it is also possible for multilayered structures comprising high- and low-refractive-index metal oxide, metal oxide hydrate, metal or metal fluoride layers to be present, with high- and low-refractive-index layers preferably alternating. Particular preference is given to layer packages comprising a high-refractive-index layer and a low-refractive-index layer, it being possible for one or more of these layer packages to be applied to the BiOCl pigments. In a further embodiment, the metal oxide, metal oxide hydrate, metal suboxide, metal, metal fluoride, metal nitride, metal oxynitride layers can be mixed or doped with colorants or other elements. Suitable colorants or other elements are, for example, organic or inorganic coloured pigments, such as coloured metal oxides, for example magnetite, chromium oxide or coloured pigments, such as, for example, Berlin Blue, ultramarine, bismuth vanadate, Thenard's Blue, or alternatively organic coloured pigments, such as, for example, indigo, azo pigments, phthalocyanines or also Carmine Red, or elements such as, for example, yttrium or antimony. BiOCl pigments containing these layers exhibit high colour variety in respect of their mass-tone and can in many cases exhibit an angle-dependent change in the colour (colour flop) through interference.

The thickness of the optional metal oxide, metal oxide hydrate, metal suboxide, metal, metal fluoride, metal nitride, metal oxynitride layers or a mixture thereof is usually 3 to 300 nm and in the case of the metal oxide, metal oxide hydrate, metal suboxide, metal fluoride, metal nitride, metal oxynitride layers or a mixture thereof, preferably 20 to 200 nm. The thickness of the optional metal layers is preferably 4 to 50 nm.

In a further embodiment of the present invention, the one or more polymers, the one or more oxides, oxide hydrates or hydroxides of silicon and/or the additional one or more layers may comprise absorbent or reflective substances. The absorbent or reflective substances are preferably selected from the group consisting of the colorants and/or UV stabilizers or UV protection agents, in particular the UV stabilizers or UV protection agents. BiOCl pigments comprising these light-absorbent substances may, in the case of colorants, exhibit additional colour effects. In the preferred case of the use of UV stabilizers or UV protection agents, the BiOCl pigments obtained exhibit increased stability to light, in particular to UV light. This prevents the undesired modification of BiOCl on irradiation and increases the range of applications of the pigments according to the invention, for example also for the outdoor sector. The layer of one or more polymers preferably comprise the UV stabilizers or UV protection agents.

Suitable colorants are, for example, organic pigments from the Colour Index list, such as, for example, monoazo pigments C.I. Pigment Brown 25, C.I. Pigment Orange 5, 13, 36, 67, C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 251, 112, 146, 170, 184, 210 and 245, C.I. Pigment Yellow 1, 3, 73, 65, 97, 151 and 183; diazo pigments C.I. Pigment Orange 16, 34 and 44, C.I. Pigment Red 144,:166, 214 and 242, C.I. Pigment Yellow 12, 13, 14, 16, 17, 81, 106, 113, 126, 127, 155, 174, 176 and 188; ananthrone pigments C.I. Pigment Red 168; anthraquinone pigments C.I. Pigment Yellow 147 and 177, C.I. Pigment Violet 31; anthrapyrimidine pigments C.I. Pigment Red 122, 202 and 206, C.I. Pigment Violet 19; quinophthalone pigments C.I. Pigment Yellow 138; dioxazine pigments C.I. Pigment Yellow 138; dioxazine pigments C.I. Pigment Violet 23 and 37; flavanthrone pigments C.I. Pigment Blue 60 and 64; isoindoline pigments C.I. Pigment Orange 69, C.I. Pigment Red 260, C.I. Pigment Yellow 139 and 185; isoindolinone pigments C.I. Pigment Orange 61, C.I. Pigment Red 257 and 260, C.I. Pigment Yellow 109, 110, 173 and 185; isoviolanthrone pigments C.I. Pigment Violet 31; metal-complex pigments C.I. Pigment Yellow 117 and 153, C.I. Pigment Green 8; perinone pigments C.I. Pigment Orange 43, C.I. Pigment Red 194; perylene pigments C.I. Pigment Black 31 and 32, C.I. Pigment Red 123, 149, 178 179, 190 and 224, C.I. Pigment Violet 29; phthalocyanine pigments C.I. Pigment Blue 15, 15:1, 15:2, 15:3, 15:4, 15:6 and 16, C.I. Pigment Green 7 and 36; pyranthrone pigments C.I. Pigment Orange 51, C.I. Pigment Red 216; thioindigo pigments C.I. Pigment Red 88 and 181, C.I. Pigment Violet 38; triarylcarbonium pigments C.I. Pigment Blue 1, 61 and 62, C.I. Pigment Green 1, C.I. Pigment Red 81, 81: 1 and 169, C.I. Pigment Violet 1, 2, 3 and 27; Aniline Black (C.I. Pigment Black 1); Aldazine Yellow (C.I. Pigment Yellow 101) and C.I. Pigment Brown 22 and liquid crystal polymers (LCP pigments). Suitable UV stabilizers are known to the person skilled in the art and are commercially available, such as, for example, UV absorbers, UV reflectors, UV diffusers, antioxidants, carbon-black particles, free-radical scavengers and microtitanium.

Suitable UV absorbers are, for example, benzotriazoles, triazines, oxanilides, benzophenones, arylated cyanoacrylates, in particular hydroxybenzotriazoles, for example phenylbenzimidazole-5-sulfonic acid (Eusolex® 232), benzophenone 5-sodium salt (Uvinul® MS 40 (BASF)), terephthalyli-denedicamphorsulfonic acid (Mexoryl® SX (Chimex)), benzylidenecam-phorsulfonic acid (Mexoryl® SL (Chimex)), disodium phenyldibenzimida-zoletetrasulfonate (Neoheliopan® AP (Symrise)), and aqueous titanium dioxide dispersions (Eusolex® T-aqua), 2-(3',5'-bis(1,1-dimethylbenzyl)-2'-hydroxyphenyl)benzotriazole, 2-(2'-hydroxy-5'-(tert-octyl)phenyl)benzotriazole, 2-(2'-hydroxy-3'-(2-butyl)-5'-(tert-butyl)phenyl)benzotriazole, bis(3-(2H-benzotriazolyl)-2-hydroxy-5-tert-octyl)methane, 2-(4-hexoxy-2-hydroxyphenyl)-4,6-diphenyl-1,3,5-triazine, and the benzophenone 2,4-dihydroxybenzophenone.

Suitable UV absorbers are furthermore carbon black and UV diffusers. UV protection agents which can be employed are likewise free-radical scavengers. Suitable free-radical scavengers are, for example, organic and inorganic nitro compounds, phenols, such as, for example, hydroquinones, fused aromatic compounds, hindered amines (HALS), such as, for example, isooctyl [3-(2H-benzotriazol-2-yl)-5-(1,1-dimethylethyl)4-hydroxy-phenyl]propionate or bis(1,2,2,6,6-pentamethyl-4-piperidinyl)decane-diolate.

In the case of UV-reflective protection agents, metals, nanoparticles, for example comprising titanium dioxide or iron oxide, titanium dioxide or barium sulfate are particularly suitable. Nanoparticles here is taken to mean organic, inorganic or metallic particles having a size of <300 nm, preferably <150 nm.

It is furthermore also possible to employ mixtures of different UV protection agents, where no limits are set on the mixing ratio. Particular preference is given to mixtures consisting of free-radical scavengers and carbon-black particles.

Particularly preferred UV stabilizers are 2-hydroxybenzophenones, 2-hydroxyphenylbenzotriazoles, 2-hydroxyphenyltriazines, oxalanilides, triazoles, triazines, titanium dioxide nanoparticles, iron oxide nanoparticles, carbon black, hindered amines (HALS), and mixtures of the said UV stabilizers.

The BiOCl pigments according to the invention preferably comprise 0.001 to 1000% by weight of the UV stabilizers or UV protection agents, particularly preferably 0.01 to 500% by weight and in particular 0.1 to 100% by weight, based on the weight of the base BiOCl material.

The present invention also relates to a process for the production of the BiOCl pigments according to the invention in which BiOCl is coated with one or more polymers and one or more oxides, oxide hydrates or hydroxides of silicon. A layer of one or more polymers and, on top of the latter, a layer of one or more oxides, oxide hydrates or hydroxides of silicon is preferably applied to BiOCl.

The coating with one or more polymers is preferably carried out for example by precipitation in water and/or organic solvents, by polycondensation reactions, by polyaddition reactions and/or by free-radical polymerisation. Processes of this type are known and familiar to the person skilled in the art. Particular preference is given to precipitation of the one or more polymers, i.e. the use of polymer precipitation processes. Polymer precipitation processes which should be mentioned by name here are, for example, lower critical solution temperature, upper critical solution temperature and solvolysis technology.

If a solvent is required in the process according to the invention, the solvent is preferably water or a water-miscible organic solvent. Water-miscible solvents also include solvents which have miscibility gaps with water. In these cases, the mixing ratios are selected in such a way that miscibility occurs. Examples of suitable solvents are mono- and polyalcohols, such as, for example, methanol, ethanol, n-propanol, isopropanol, glycol, glycerol, propylene glycol, polyethylene glycol, polybutylene glycol and the mono- and diethers of polyalkylene glycols with methanol, ethanol, propanol and butanol, in addition ethers, such as, for example, tetrahydrofuran, dioxane, 1,2-propanediol propyl ether, 1,2-butane 1-methyl ether, ethylene glycol monomethyl ether and diethylene glycol monomethyl ether. Also suitable are esters, such as, for example, methyl acetate, monoesters of ethylene glycol or propylene glycol with acetic acid, butyrolactone, but also ketones, such as, for example, acetone or methyl ethyl ketone, or amides, such as, for example, formamide, dimethylformamide, dimethylacetamide, N-methylpyrrolidone and hexamethylphosphoric triamide, or sulfoxides and sulfones, such as dimethyl sulfoxide and sulfolane, and alkanecarboxylic acids, such as formic acid or acetic acid. Preferred solvents are water and alcohols or glycols.

The coating with one or more oxides, oxide hydrates or hydroxides of silicon can be carried out, for example, by wet-chemical methods, by means of sol-gel processes or by CVD or PVD processes.

In the case of coating by the sol-gel process, use is preferably made of silicon alkoxides in the-form of a solution, and the silicon alkoxides are decomposed hydrolytically using water. Preferred silicon alkoxides are tetraalkoxysilanes, in particular tetraethoxysilane.

Preference is given to wet-chemical application, for example through the use of aqueous sols and solutions. A preferred example is the deposition of silicon dioxide from water-glass.

The coating with oxides, oxide hydrates or hydroxides can also be carried out via PVD or CVD processes. These processes are known from the literature, for example from U.S. Pat. No. 3,123,489.

In a further embodiment of the process according to the invention, one or more layers may additionally be applied by wet-chemical methods, by means of sol-gel processes or by CVD or PVD processes. The processes which can be employed have been mentioned above and can be selected and optimized depending on the material. The application, in particular in the case of metal oxides, is preferably carried out by wet-chemical methods.

In addition, absorbent or reflective substances can be incorporated into the layers of one or more polymers, the one or more oxides, oxide hydrates or hydroxides of silicon and/or the additional one or more layers.

The absorbent or reflective substances, in particular UV protection agents or UV stabilizers, are either applied directly to BiOCl and immobilized with one or more polymers, oxides, oxide hydrates or hydroxides of silicon and/or the additional one or more layers or applied to and immobilized on the surface in one step as a mixture with one or more polymers, oxides, oxide hydrates or hydroxides of silicon and/or the additional one or more layers. The UV protection agent is preferably applied together with an immobilizable polymer or polymer mixture or together with the SiO$_2$ coating, if necessary in the presence of a solvent. Suitable solvents have already been mentioned above.

The BiOCl pigments according to the invention can of course be calcined, with the calcination preferably being carried out after application of the one or more oxides, oxide hydrates or hydroxides of silicon or the additional one or more layers. The calcination is preferably carried out at temperatures of 450 to 600° C., in particular at 500 to 550° C., where the duration of the calcination can be between 10 and 90 minutes, in particular between 20 and 60 minutes. The calcination further increases the stability of the pigments, in particular to the effect of moisture.

The BiOCl pigments according to the invention can be employed in a variety of applications and can be employed in areas in which the use of BiOCl pigments was hitherto impossible. Accordingly, the present invention like-wise relates to the use of the pigments according to the invention in surface coatings, water-borne coatings, powder coatings, paints, printing inks, security printing inks, plastics, concrete, in cosmetic formulations, in agricultural sheeting and tarpaulins, for the laser marking of papers and plastics, as light protection, and for the preparation of pigment compositions and dry preparations.

In the case of cosmetics, the BiOCl pigments according to the invention are particularly suitable for products and formulations in decorative cosmetics, such as, for example, nail varnishes, colouring powders, lipsticks or eye-shadows, soaps, toothpastes, etc. The BiOCl pigments according to the invention can of course also be combined in the formulations with cosmetic raw materials and auxiliaries of all types. These include, inter alia, oils, fats, waxes, film formers, preservatives and auxiliaries which generally determine applicational properties, such as, for example, thickeners and rheological additives, such as, for example, bentonites, hectorites, silicon dioxide, Ca silicates, gelatine, high-molecular-weight carbohydrates and/or surface-active auxiliaries, etc. The formulations comprising BiOCl pigments according to the invention can belong to the lipophilic, hydrophilic or hydrophobic type. In the case of heterogeneous formulations with discrete aqueous and non-aqueous phases, the particles according to the invention may be present in, in each case, only one of the two phases or alternatively distributed over both phases.

The pH values of aqueous formulations of the pigments can be between 1 and 14, preferably between 2 and 11 and particularly preferably between 5 and 8. No limits are set for the concentrations of the BiOCl pigments according to the invention in the formulations. They can be—depending on the application—between 0.001 (rinse-off products, for example shower gels) and 99% (for example luster-effect articles for particular applications in the case of the use of effect pigments as substrate).

The BiOCl pigments according to the invention may furthermore also be combined with cosmetic active ingredients. Suitable active ingredients are, for example, insect repellents, UV A/BC protection filters (for example OMC, B3, MBC), anti-ageing active ingredients, vitamins and derivatives thereof (for example vitamin A, C, E, etc.), self-tanning agents (for example DHA, erythrulose, inter alia), and further cosmetic active ingredients, such as, for example, bisabolol, LPO, ectoine, emblica, allantoin, bioflavonoids and derivatives thereof.

In the case of the use of the BiOCl pigments in paints and coatings, all areas of application known to the person skilled in the art are possible, such as, for example, powder coatings, automobile paints, printing inks for gravure, offset, screen or flexographic printing, and for coatings in outdoor applications. A multiplicity of binders, in particular water-soluble grades, is suitable for the preparation of printing inks, for example based on acrylates, methacrylates, polyesters, polyurethanes, nitrocellulose, ethylcellulose, polyamide, polyvinyl butyrate, phenolic resins, maleic resins, starch or polyvinyl alcohol. The surface coatings can be water- or solvent-based coatings, where the choice of the coating constituents is subject to the general knowledge of the person skilled in the art. They are preferably water-based coating systems, for example offset overprint varnishes.

In addition, the BiOCl pigments according to the invention can be used in films and plastics, for example in agricultural sheeting, infrared-reflective foils and sheets, gift foils, plastic containers and moldings for all applications known to the person skilled in the art. Suitable plastics for the incorporation of the BiOCl pigments according to the invention are all common plastics, for example thermosets or thermoplastics. The description of the possible applications and the plastics which can be employed, processing methods and additives are given, for example, in RD 472005 or in R. Glausch, M. Kieser, R. Maisch, G. Pfaff, J. Weitzel, Periglanzpigmente [Pearlescent Pigments], Curt R. Vincentz Verlag, 1996, 83 ff., the disclosure content of which is also incorporated herein.

The BiOCl pigments according to the invention are likewise suitable in the above-mentioned areas of application for use in blends with organic dyes and/or pigments, such as, for example, transparent and opaque white, coloured and black pigments, and with flake-form iron oxides, organic pigments, holographic pigments, LCPs (liquid crystal polymers) and conventional transparent, coloured and black luster pigments based on metal oxide-coated flakes based on mica, glass, Al$_2$O$_3$, Fe$_2$O$_3$, SiO$_2$, etc. The BiOCl pigments according to the invention can be mixed in any ratio with commercially available pigments and fillers.

Fillers which may be mentioned are, for example, natural and synthetic mica, nylon powder, pure or filled melanin resins, talc, glasses, kaolin, oxides or hydroxides of aluminum, magnesium, calcium, zinc, BiOCl, barium sulfate, calcium sulfate, calcium carbonate, magnesium carbonate, carbon, and physical or chemical combinations of these substances. There are no restrictions with respect to the particle shape of the filler. It can be, for example, flake-form, spherical or needle-shaped in accordance with requirements.

The BiOCl pigments according to the invention are furthermore suitable for the preparation of flowable pigment compositions and dry preparations comprising one or more particles according to the invention, binders and optionally one or more additives. Dry preparations is also taken to mean preparations which comprise 0 to 8% by weight, preferably 2 to 8% by weight, in particular 3 to 6% by weight, of water and/or a solvent or solvent mixture. The dry preparations are preferably in the form of pellets, granules, chips, sausages or briquettes and have particle sizes of 0.2-80 mm. The dry preparations are used, in particular, in the preparation of printing inks and in cosmetic formulations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

In the foregoing and in the following examples, all temperatures are set forth uncorrected in degrees Celsius and, all parts and percentages are by weight, unless otherwise indicated.

Example 1 a) Coating with Polymer:

116.7 g of styrene acrylate solution (30% in water) containing styrene acrylates having a molecular weight of 12,000 daltons and a pH of 8.4 are added to 500 g of BiOCl (70% in water). The pH is adjusted to 8. Polymer-coated BiOCl is obtained.

b) Coating with $SiO_2$:

145 g of sodium water-glass (27.6%) are diluted to a solids content of 15% using 121.6 g of water. The sodium water-glass solution obtained is added to 286 g of the product obtained in a) in 1720 g of water at 85° C., and the mixture is stirred for 60 minutes. The pH is held at 7.5 using HCl (20%) during the coating. In order to complete the reaction, the mixture is stirred for a further 60 minutes.

c) Work-Up:

The batch is washed with water until salt-free and sucked dry via a suction filter. The filter cake obtained is dried to constant weight at 65° C. in a vacuum drying cabinet and subsequently calcined in a calcination oven at 500° C. for 30 minutes. This gives a flowable, lustrous preparation which exhibits virtually no noticeable haze or loss of the pearlescent character even after 12 months.

d) Use in the Printing Sector:

40 g of the product obtained in c) are added with stirring to an aqueous solution of 15 g of water and 5 g of AMP-75 (2-amino-2-methyl-1-propanol; 75% in water). After 20 minutes, 60 g of aqueous offset overprint varnish Senolith WL high-gloss varnish 350081 from Weilburger Graphics are added, and the mixture is stirred for a further 10 minutes. The viscosity of the resultant printing ink is adjusted by addition of water (efflux time about 20 s, measured in a DIN 4 cup/23° C.).

Proofs are printed in a low-pressure laboratory proof printer of the Labratester type from Schläfli/Switzerland. A uniform print having a high pearlescent character is obtained.

Example 2

Steps a) and b) see Example 1.

c) Coating with $Fe_2O_3$:

278 g of iron(III) chloride solution (15.0%) are diluted to an iron content of 10% using 122 g of water. The resultant iron solution is slowly added to 286 g of the product obtained in b) in 1720 g of water at 75° C., and the mixture is stirred for 270 minutes. The pH is held at 3.0 using NaOH (20%) during the coating. In order to complete the reaction, the mixture is stirred for a further 30 minutes.

d) Work-Up:

The batch is washed with water until salt-free and sucked dry via a suction filter. The filter cake obtained is dried to constant weight at 65° C. in a vacuum drying cabinet and subsequently calcined in a calcination oven at 500° C. for 30 minutes. This gives a flowable, bronze-coloured, lustrous preparation which exhibits virtually no noticeable haze or loss of the pearlescent character even after 12 months.

e) Use in the Printing Sector:

40 g of the product obtained in d) are added with stirring to an aqueous solution of 15 g of water and 5 g of AMP-75 (2-amino-2-methyl-1-propanol; 75% in water). After 20 minutes, 60 g of aqueous offset overprint varnish Senolith WL high-gloss varnish 350081 from Weilburger Graphics are added, and the mixture is stirred for a further 10 minutes. The viscosity of the resultant printing ink is adjusted by addition of water (efflux time about 20 s, measured in a DIN 4 cup/23° C.).

Proofs are printed in a low-pressure laboratory proof printer of the Labratester type from Schläfli/Switzerland. A uniform print having a high pearlescent character is obtained.

Example 3

Steps a) and b) see Example 1.

c) Coating with $Fe_2[Ti]O_5$:

286 g of the product obtained in b) in 1720 g of water are slowly heated to 75° C. When this temperature has been reached, 117.5 g of titanium tetrachloride solution (25.3%) are mixed with 257.4 g of iron(III) chloride solution (15%) and 8.8 g of aluminum(II) chloride solution, pre-dissolved in 225.3 g of water, mixed with a further 610 g of water and slowly metered in. The pH is held at 2.6 by addition of NaOH (32%) during the coating. In order to complete the reaction, the mixture is stirred for a further 30 minutes.

d) Work-Up:

The batch is washed with water until salt-free and sucked dry via a suction filter. The filter cake obtained is dried to constant weight at 65° C. in a vacuum drying cabinet and subsequently calcined in a calcination oven at 500° C. for 30 minutes. This gives a flowable, highly lustrous preparation having gold-coloured interference which exhibits virtually no noticeable haze or loss of the pearlescent character after 12 months.

e) Use in the Printing Sector:

40 g of the product obtained in d) are added with-stirring to an aqueous solution of 15 g of water and 5 g of AMP-75 (2-amino-2-methyl-1-propanol; 75% in water). After 20 minutes, 60 g of aqueous offset overprint varnish Senolith WL high-gloss varnish 350081 from Weilburger Graphics are added, and the mixture is stirred for a further 10 minutes. The viscosity of the resultant printing ink is adjusted by addition of water (efflux time about 20 s, measured in a DIN 4 cup/23° C.).

Proofs are printed in a low-pressure laboratory proof printer of the Labratester type from Schläfli/Switzerland. A uniform print having a high pearlescent character is obtained.

Example 4

Step a) see Example 1.

b) Coating with $SiO_2$ Comprising a UV Absorber:

145 g of sodium water-glass (27.6%) are diluted to a solids content of 15% using 121.6 g of water. The sodium water-glass solution obtained is added to 286 g of the product obtained in a) in 1720 g of water at 75° C., and the mixture is stirred for 60 minutes. The pH is held at 7.5 using HCl (20%) during the coating. After a post-stirring time of 60 minutes, the batch is cooled to 30° C. 4 g of benzotriazole UV absorber Tinuvin® 1130 (Ciba AG) are stirred into the batch present. The batch is washed with water until salt-free and sucked dry via a suction filter. The filter cake obtained is dried to constant weight at 65° C. in a vacuum drying cabinet and subsequently calcined in a calcination oven at 500° C. for 30 minutes, giving a flowable, lustrous preparation.

The entire disclosure of all applications, patents and publications, cited herein and of corresponding German application No. 10 2004 023 075.7, filed May 11, 2004 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A stabilized BiOCl pigment, which comprises a base BiOCl pigment which has a coating comprising one or more polymers and a coating comprising one or more oxides, oxide hydrates or hydroxides of silicon, wherein the coating comprising one or more polymers and the coating comprising one or more oxides, oxide hydrates or hydroxides of silicon are provided as separate coatings and, wherein the coating comprising one or more oxides, oxide hydrates or hydroxides of silicon is provided on top of the coating comprising one or more polymers.

2. A stabilized BiOCl pigment according to claim 1, wherein the coating comprising one or more polymers is provided directly on the base BiOCl pigment.

3. A stabilized BiOCl pigment according to claim 1, wherein the coating of one or more oxides, oxide hydrates or hydroxides of silicon comprises silicon dioxide.

4. A stabilized BiOCl pigment according to claim 1, wherein the coating of one or more polymers comprises a polyether, polyacrylate, polyvinylcaprdactam, cellulose, polystyrene, polyvinyl alcohol, polyvinylpyrrolione, polyvinyl acetate, polysiloxane, LCST or UCST polymer, polymer containing a solvolysable group, a derivative of the above polymers or a mixture of any of the above.

5. A stabilized BiOCl pigment according to claim 1, wherein the pigment comprises one or more additional coatings.

6. A stabilized BiOCl pigment according to claim 5, wherein one or more additional coatings comprise one or more metal oxides, metal oxide hydrates, metal suboxides, metals, metal fluorides, metal nitrides, metal oxynitrides or mixtures of these materials.

7. A stabilized BiOCl pigment according to claim 1, wherein the pigment comprises at least one coating which comprises a light absorbent or reflective substance.

8. A stabilized BiOCl pigment according to claim 7, wherein the light absorbent or reflective substance is selected from the group consisting of colorants, UV stabilizers and UV protection agents.

9. A process for the production of a stabilized BiOCl pigment according to claim 1, which comprises coating a base BiOCl pigment with one or more polymers and subsequently coating with one or more oxides, oxide hydrates or hydroxides of silicon.

10. A process according to claim 9, wherein the coating with one or more polymers is carried out by precipitation in water and/or organic solvents, by a polycondensation reaction, by a polyaddition reaction and/or by a free-radical polymerization.

11. A process according to claim 9, wherein the coating with the one or more oxides, oxide hydrates or hydroxides of silicon is carried out by a wet-chemical method, by a sol-gel process or by a CVD or PVD process.

12. A process according to claim 9, which further comprises coating with one or more additional layers by a wet-chemical method, by a sol-gel process or by a CVD or PVD process.

13. A process according to claim 9, which further comprises incorporating a light absorbent or reflective substance into at least one of the coatings on the pigment.

14. A surface coating, water-borne coating, powder coating, paint, printing ink, security printing ink, plastic, concrete, cosmetic formulation, agricultural sheeting or tarpaulin, laser-markable paper or plastic, light protection pigment, pigment composition or dry pigment composition comprising a pigment according to claim 1.

* * * * *

UNITED STATES PATENT AND TRADEMARK OFFICE
CERTIFICATE OF CORRECTION

PATENT NO.        : 7,318,862 B2
APPLICATION NO.   : 11/125170
DATED             : January 15, 2008
INVENTOR(S)       : Griessmann Carsten It is certified that error appears in the above-identified patent and that said Letters Patent is hereby corrected as shown below:

Column 11, line 42, reads "polyvinylcaprdactam," should read
-- polyvinylcaprolactam, --
Column 11, line 43, reads "polyvinylpyrrolione" should read
-- polyvinylpyrrolidone, --

Signed and Sealed this

Seventeenth Day of June, 2008

JON W. DUDAS
*Director of the United States Patent and Trademark Office*